United States Patent
Gottin et al.

(10) Patent No.: US 11,176,488 B2
(45) Date of Patent: Nov. 16, 2021

(54) ONLINE ANOMALY DETECTION USING PAIRWISE AGREEMENT IN HETEROGENEOUS MODEL ENSEMBLE

(71) Applicant: EMC IP Holding Company LLC, Hopkinton, MA (US)

(72) Inventors: Vinícius Michel Gottin, Rio de Janeiro (BR); Tiago Salviano Calmon, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 890 days.

(21) Appl. No.: 15/941,439

(22) Filed: Mar. 30, 2018

(65) Prior Publication Data
US 2019/0303799 A1 Oct. 3, 2019

(51) Int. Cl.
*G06F 11/34* (2006.01)
*G06N 20/00* (2019.01)
*G06F 11/30* (2006.01)

(52) U.S. Cl.
CPC ......... *G06N 20/00* (2019.01); *G06F 11/3034* (2013.01); *G06F 11/3447* (2013.01)

(58) Field of Classification Search
CPC .. G06F 11/3447; G06F 11/30; G06F 11/3089; G06F 11/34; G06F 11/1176; G06F 11/1476; G06N 20/00; G06N 20/20; G06N 20/10
See application file for complete search history.

(56) References Cited

U.S. PATENT DOCUMENTS

| | | | |
|---|---|---|---|
| 9,516,053 B1 * | 12/2016 | Muddu | H04L 63/1433 |
| 9,900,332 B2 * | 2/2018 | Muddu | G06F 16/444 |
| 2014/0281738 A1 * | 9/2014 | Urmanov | G06F 11/0709 |
| | | | 714/47.1 |
| 2017/0286841 A1 * | 10/2017 | Yoshinaga | G06N 5/04 |

(Continued)

OTHER PUBLICATIONS

Kruegel et al., "Anomaly detection of web-based attacks," in Proceedings of the 10th ACM conference on Computer and communications security, 2003.

(Continued)

*Primary Examiner* — Yolanda L Wilson
(74) *Attorney, Agent, or Firm* — Ryan, Mason & Lewis, LLP

(57) ABSTRACT

Techniques are provided for online anomaly detection using pairwise agreement in a heterogeneous model ensemble. An exemplary contextual model agreement network comprises nodes and transition edges between the nodes, where each node corresponds to a machine learning model and the transition edges between corresponding pairwise machine learning models encode a level of historical agreement between the pairwise machine learning models. In response to an availability of new data observations: features present in the data observations are extracted; a subset of the machine learning models is selected from the machine learning models based on the extracted features; the historical agreement between the selected machine learning models is compared with a current agreement of the selected machine learning models; and an anomaly is detected in the data observations based on the comparison. The contextual model agreement network is optionally updated based on new data observations.

20 Claims, 11 Drawing Sheets

(56) References Cited

U.S. PATENT DOCUMENTS

| | | | | |
|---|---|---|---|---|
| 2018/0069888 A1* | 3/2018 | Muddu | .................... | G06N 5/04 |
| 2018/0365090 A1* | 12/2018 | Ben Simhon | ........... | H04L 43/16 |
| 2019/0005407 A1* | 1/2019 | Harris | .................... | G06N 3/088 |
| 2019/0286071 A1* | 9/2019 | Theurer | ............. | G05B 13/0265 |
| 2019/0378050 A1* | 12/2019 | Edkin | ................ | G06Q 30/0185 |
| 2019/0378074 A1* | 12/2019 | McPhatter | ......... | G06Q 10/0637 |
| 2019/0387005 A1* | 12/2019 | Zawoad | .............. | H04L 63/1425 |
| 2020/0210824 A1* | 7/2020 | Poornaki | .............. | G06N 3/0445 |

OTHER PUBLICATIONS

Heard et al., "Bayesian anomaly detection methods for social networks," The Annals of Applied Statistics, vol. 4, n° 2, pp. 645-662, 2010.

Noble et al., "Graph-based anomaly detection," em Proceedings of the ninth ACM SIGKDD international conference on Knowledge discovery and data mining, 2003.

U.S. Appl. No. 15/497,803 entitled "A Network-Based Method for Processes Dependent on Heterogeneous Machine Learning Models", filed Apr. 26, 2017.

U.S. Appl. No. 15/364,449 entitled "Snapshots to Train Prediction Models and Optimize Workflow Execution", filed Nov. 30, 2016.

U.S. Appl. No. 15/884,768 entitled "Methods and Apparatus for Real-Time Anomaly Detection over Sets of Time Series", filed Jan. 31, 2018.

* cited by examiner

300

ONLINE ANOMALY DETECTION USING PAIRWISE AGREEMENT IN HETEROGENEOUS MODEL ENSEMBLE

FIELD

The field relates generally to the detection of anomalies.

BACKGROUND

Anomaly detection systems are widely applied in contexts with inherent complexity and large volumes of data, such as data center management, industrial applications and in financial scenarios. In these scenarios, proper detection of anomalies empowers decision makers to derive an action plan for each state of interest, for example, by preventing a disruptive effect with respect to subsequent states, triggering self-tuned policies to handle such events and/or acting manually in a timely manner to diminish losses.

A need therefore exists for improved techniques for anomaly detection.

SUMMARY

Illustrative embodiments of the present disclosure provide techniques for online anomaly detection using pairwise agreement in a heterogeneous model ensemble. In one embodiment, an exemplary method comprises: obtaining a contextual model agreement network comprising a plurality of nodes and transition edges between the plurality of nodes, wherein each node corresponds to one of a plurality of machine learning models and the transition edges between corresponding pairwise machine learning models encode a level of historical agreement between the corresponding pairwise machine learning models, for a plurality of subsets of features observed in historical training data, when the subsets of features are present in the historical training data; and performing the following steps, in response to an availability of one or more data observations: extracting the features present in the data observations; selecting a subset of the machine learning models from the plurality of machine learning models based on the extracted features; comparing the historical agreement between the selected subset of the machine learning models with a current agreement of the selected subset of the machine learning models based on predictions by the selected subset of the machine learning models; and detecting an anomaly in the data observations based on the comparison.

In some embodiments, the transition edges in the contextual model agreement network further encode a level of confidence of the historical agreement between the corresponding pairwise machine learning models, based on a number of samples in the historical training data configuring the subsets of features shared by the machine learning models. The level of confidence of the historical agreement between the corresponding pairwise machine learning models is optionally updated in response to a processing of the data observations.

In at least one embodiment, an anomaly is detected in the data observations by evaluating whether pairwise machine learning models that historically agree disagree based on the data observations and/or whether pairwise machine learning models that historically disagree now agree based on the data observations.

In some embodiments, the contextual model agreement network is optionally updated to distinguish between anomalies and a new mode of operation. For example, the levels of historical agreement in the contextual model agreement network can be adapted when a new observation is passed through one or more of the machine learning models using one or more of an exponential smoothing technique and an anomaly-weighted exponential smoothing technique.

Other illustrative embodiments include, without limitation, apparatus, systems, methods and computer program products comprising processor-readable storage media.

DETAILED DESCRIPTION

Figure 1A:
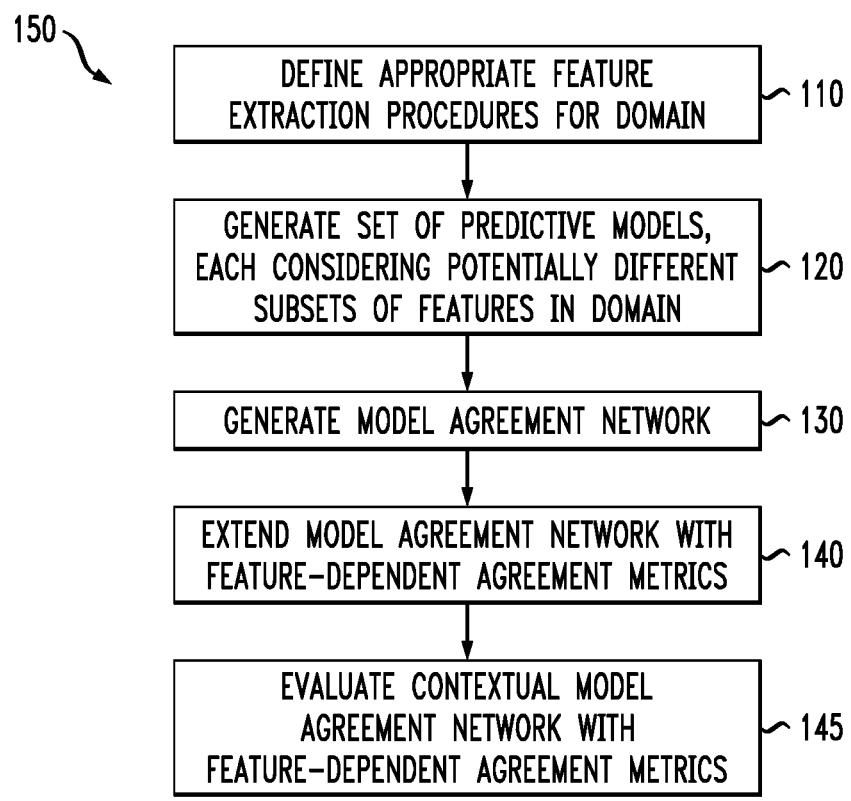
FIG. 1A is a flow chart illustrating an exemplary implementation of a contextual model agreement network generation process, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for online anomaly detection using pairwise agreement in a heterogeneous model ensemble.

The application of machine learning models to the problem of anomaly detection is widely explored in the scientific literature. Typically, many complementary models are generated in parallel and used depending on the available features. The models naturally have a certain level of redundancy (e.g., the capacity to agree on the prediction of a common observation given inputs with shared features). Simultaneously, models are meant to capture different patterns by looking at different signals, thus providing complementary points-of-view. One way of leveraging these corroborating models is to assemble them in an ensemble model comprised of multiple machine learning models.

One or more embodiments of the present disclosure provide a method, system and/or computer program product for feature-aware anomaly detection based on the agreement metrics of ensemble models comprised of multiple machine learning models and the current predictions yielded by the models that configure such ensembles. These models, evaluated on data with the same features, have a historical agreement level, which can be compared to current agreement levels to discover anomalies.

In some embodiments, multiple machine learning models are represented as nodes in a contextual model agreement network, as discussed further below in conjunction with FIG. 8, and the transition edges between nodes in the contextual model agreement network encode a number of features present in input data and the level of historical agreement between these pairwise models when presented with data with the aforementioned features. In this manner, the real-time responses of the multiple machine learning models can be compared.

The structure of the exemplary contextual model agreement network of machine learning models and levels of agreements can be used to detect anomalies in incoming data observations from a process. This can optionally be supported by levels of confidence, depending on the features present in the data, computed through model checking algorithms, as discussed further below.

It is assumed in some embodiments that the presence or absence of features in data can be checked in real-time or near real-time. Having a feature set from the incoming data observations, the subgraph of the contextual model agreement network containing edges with that same feature set and the nodes connected to such edges are obtained and the new classification is compared to the historical agreement. If there is divergence, the new piece of data is considered potentially anomalous.

When in a real-time production environment, for example, the disclosed anomaly detection engine can optionally distinguish between anomalies and new modes of operation. The disclosed techniques for real-time anomaly detection optionally embody an adaptation in the graph that enables this feature. When a new observation is passed through the relevant machine learning models composing the contextual model agreement network, the weights in the edges, and optionally the levels of confidence, are also updated.

In at least one embodiment of the disclosure, the update procedure is performed using an exponential smoothing technique. The exemplary exponential smoothing algorithm allows lightweight computing, since only the current contextual model agreement network needs to be stored. In another embodiment of this disclosure, an anomaly-weighted exponential smoothing technique is employed.

FIG. 1A is a flow chart illustrating an exemplary implementation of a contextual model agreement network generation process 100, according to one embodiment of the disclosure. As shown in FIG. 1A, the exemplary contextual model agreement network generation process 100 comprises the following steps, in relation to historical training data.

During step 110, the exemplary contextual model agreement network generation process 100 defines appropriate feature extraction procedures for the domain. Thereafter, a set of predictive models is generated during step 120, each considering potentially different subsets of the features in the domain, as discussed further below in conjunction with FIG. 4.

During step 130, a model agreement network 300 is generated, as discussed further below in conjunction with FIG. 3, which computes an agreement metric for each pair of machine learning models in the ensemble.

The model agreement network 300 is extended during step 140 with feature-dependent agreement metrics, representing the agreement between machine learning models for a plurality of subsets of features of the domain to generate the contextual model agreement network 800, as discussed further below in conjunction with FIGS. 7 and 8.

The contextual model agreement network 800 is evaluated during step 145 for properties that indicate scenarios of interest (e.g., of either high or low confidence on the existence of anomalies), as discussed further below in conjunction with FIG. 9.

Figures 1B, 2:
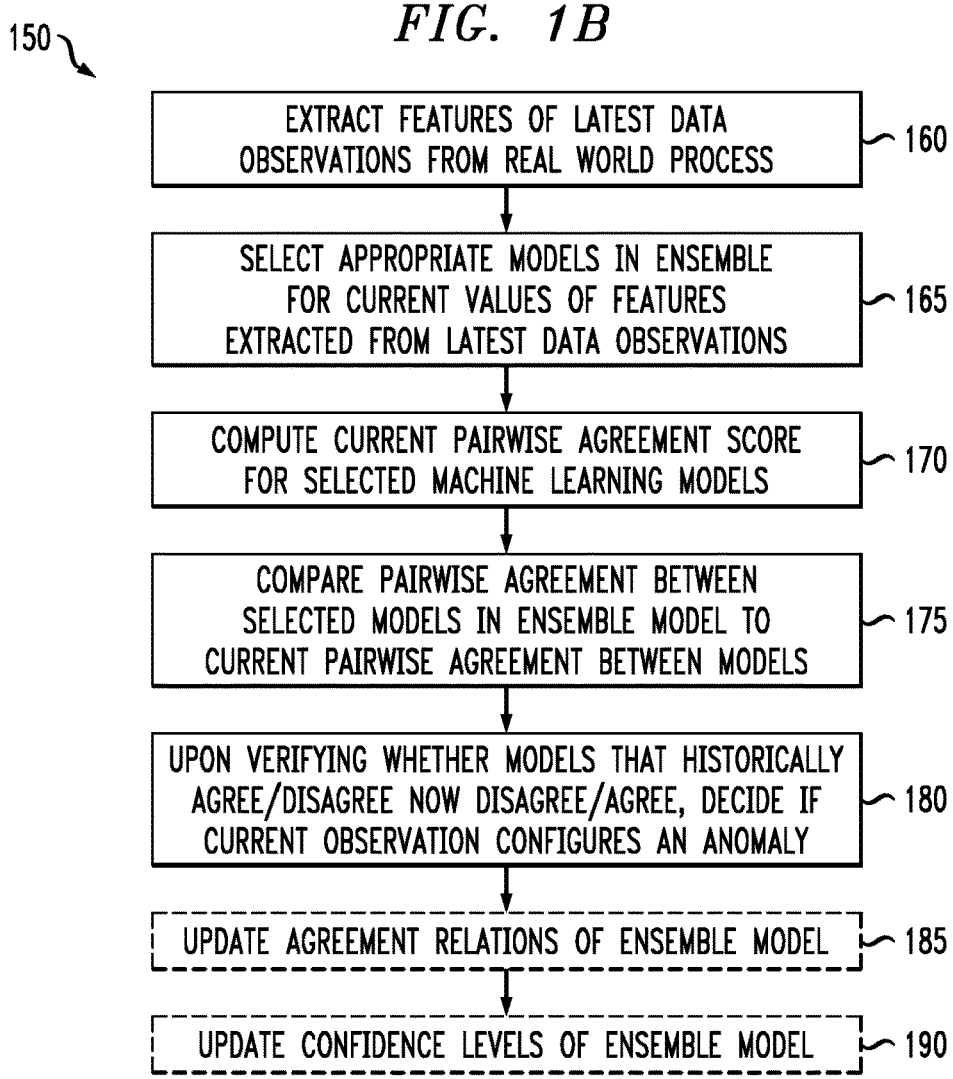
FIG. 1B is a flow chart illustrating an exemplary implementation of a real-time anomaly detection process, according to an embodiment.
FIG. 2 illustrates exemplary pseudo code for a pairwise agreement calculation function, according to some embodiments of the disclosure.

FIG. 1B is a flow chart illustrating an exemplary implementation of a real-time anomaly detection process 150, according to one embodiment of the disclosure. As shown in FIG. 1B, the exemplary real-time anomaly detection process 150 comprises the following steps, in response to data observations from a process, possibly resulting from monitoring a process in real-time or near real-time fashion.

During step 160, the exemplary real-time anomaly detection process 150 extracts the features of the latest data observations from the real world process, as discussed further below in conjunction with FIG. 10. Thereafter, during step 165 the appropriate machine learning models in the ensemble are selected for the current values of the features extracted from the latest data observations, as discussed further below in conjunction with FIG. 11.

The exemplary real-time anomaly detection process 150 then computes a current pairwise agreement score for the selected machine learning models based on the predictions by such machine learning models given the latest data observations during step 170, as discussed further below in conjunction with FIG. 12.

During step 175, the exemplary real-time anomaly detection process 150 compares the pairwise agreement between the selected models in the ensemble model to the current pairwise agreement between the machine learning models, as discussed further below in conjunction with FIG. 13.

Upon verifying whether models that historically agree/disagree now disagree/agree, the real-time anomaly detection process 150 decides if the current data observation configures an anomaly in the time series data during step 180, as discussed further below in conjunction with FIG. 13.

During step 185, the exemplary real-time anomaly detection process 150 optionally updates agreement relations of the ensemble model accordingly, as discussed further below in conjunction with a section entitled "Continuous Update of Model Ensemble Agreement Relations." Finally, during step 190, the exemplary real-time anomaly detection process 150 optionally updates the confidence level on the represented agreements of the ensemble model.

At least one embodiment of the disclosure provides for real-time anomaly detection in complex environments. In particular, multiple machine learning models are leveraged for anomaly detection. The disclosed techniques described herein are of value for any kind of system in which large volumes of data configuring the behavior of a monitored system are collected and in which the identification of anomalous behavior is required for safety, efficiency and/or regulatory purposes, as would be apparent to a person of ordinary skill in the art.

Real-time anomaly detection is a hard problem, particularly in complex environments, where the behavior of the system is configured by large volumes of data. It is often necessary to discard predictions over anomalous states so as not to make wrong management decisions. Typically, in such environments, multiple predictive models are necessary to capture distinct (potentially overlapping) aspects of the underlying processes. This might be the case, for example, in:

Long processes where subprocesses configure enough complexity so as to warrant specific models, such as, for example, supply chain processes supported by IoT (Internet of Things), where the warehouse operation is a subprocess that is separated from the remainder of the transportation chain by a well-defined schedule;

Domains where distinct modes of operation warrant specific models, such as, for example, in an offshore oil platform, where the measurements yielded by the millions of sensors configure very different behaviors when in full production and when performing operational maintenance; and/or Domains where substantially similar machine learning models are trained with changes in hyper-parameters, such as, for example, in model-as-a-service applications, where users employ pay-per-use models as black-boxes hosted in public clouds.

Any typical application of machine learning models in such cases faces the problem of mediating the disagreement between these many available models (e.g., models can yield conflicting predictions with the same input data). Furthermore, since anomalies are typically rare and can be severely underrepresented in the training data used to generate the models, these disagreements may originate from anomalous behavior—but not exclusively. Thus, previous work on selecting the correct predictions cannot be directly applied, such as U.S. patent application Ser. No. 15/497,803, filed Apr. 26, 2017, entitled "Network-Based Combination of Heterogeneous Machine Learning Models," as it is possible that some of the competing answers are actually completely erroneous.

In one or more embodiments of the present disclosure, such disagreements between pairs of models are actively managed, in comparison with their historical agreement as yielded by a meta-model, in order to perform anomaly detection.

Another problem in such contexts is dealing with the contextual and dynamic nature of the underlying real-world process. In a domain with multiple models, context of the current state is important, as it dictates which models are more trustworthy. Furthermore, as the underlying process may configure several distinct (though similar) modes of operation, certain machine learning models may be specialized to capture the behavior of only one (or a subset) of all modes.

In at least one application of machine learning models in this context, the extraction of relevant features implicitly identifying the current modes of operation is performed. These features can be used to select the most appropriate models, based on past performance of such models in previous cases where similar features were present in the data. A final problem is that anomaly detection engines should strive to operate as fast as possible, dealing with potentially large volumes of data, so as to allow online decision making.

Representation of Features and Extraction

The disclosed techniques for real-time anomaly detection employ the comparative results of multiple machine learning models. One important aspect of this comparison is that each of these models generates appropriate predictions for a certain subset of 'cases' in a domain. Feature extraction is employed in order to represent these different subsets of cases. More specifically, datasets comprising similar contextual features configure similar cases. These 'cases' are referred to herein as states of the domain.

Thus, one or more embodiments of the disclosed techniques for real-time anomaly detection build upon previous work on feature extraction, such as in U.S. patent application Ser. No. 15/497,803, referenced above, that focused on the extraction of features from workflow executions in a shared infrastructure environment.

Another possible approach for feature extraction includes deriving a graph of connected states and their probability of transitioning to one another as the edge weights. This graph can be built using training data without prior knowledge of the number of states in the system, as in U.S. patent application Ser. No. 15/884,768, filed Jan. 31, 2018, entitled "Methods and Apparatus for Real-Time Anomaly Detection over Sets of Time Series Data," that allows for the creation of a large number of states without a-priori knowledge of the range of possible cases explicit on the data. It is then possible to infer the state configured by the set of time series collected from the application environment from that graph. Furthermore, it is possible to infer how models agree at each state, as defined by the extracted feature set.

Model Ensemble and Agreement

One of the key challenges raised by organizations that are dependent on machine learning models relates to the parallel development of complementary models. Given a common objective (e.g., to predict a globally meaningful variable), different teams of analysts may have (1) different sets of features at hand, (2) different sets of possible algorithms, and (3) may train their models with data from different timeframes.

The heterogeneous machine learning models may be visualized as a network where models are represented as nodes, and pairwise relationships between models (such as levels of redundancy and complementarity) are represented as edges. In this context, the resulting network topologies can be navigated in order to leverage the intelligence available regarding a common phenomenon.

U.S. patent application Ser. No. 15/497,803, referenced above, depicts a method that allows for, among other aspects, finding the levels of redundancy and complementarity between pairs of models in an ensemble, and encoding such information on the different networks of models, enabling the navigation through the resulting network topologies.

FIG. 2 illustrates exemplary pseudo code for a pairwise agreement calculation function 200, according to one embodiment of the disclosure, adapted from U.S. patent application Ser. No. 15/497,803. The exemplary pairwise agreement calculation function 200 comprises the steps of obtaining a global test set of observations, feeding the global test set to pairs of models, and counting the number of correct predictions a particular pair achieves.

By assigning such agreement values to the corresponding edges in a network of machine learning models, the model agreement network 300 can be constructed. FIG. 3 illustrates an exemplary model agreement network 300, according to one embodiment of the disclosure. The exemplary model agreement network 300 is based on counting a number of agreements or disagreements over predictions in a universal test set and thus illustrates the agreement among the nodes representing the various heterogeneous machine learning models. As shown by the Key in FIG. 3, solid circles represent Decision Tree models, while gray circles represent Support Vector Machine models. The models were all trained with different sets of characteristics, but they predict the same phenomenon.

As noted above, the model agreement network 300 is constructed by assigning such agreement values to the corresponding edges in the network of models. The exemplary model agreement network 300 shown in FIG. 3 comprises a total of 10 models, with eight Support Vector Machines (SVMs) and two Decision Trees. Thus, the exemplary model agreement network 300 comprises 10 nodes and 23 edges among them. The edges are optionally pruned with agreement values below the average of the network 300. The models in FIG. 3 were trained with random sets of features, different configurations, and have an individual performance above the median model (pruned from a larger initial set of 20 models).

Figure 3:
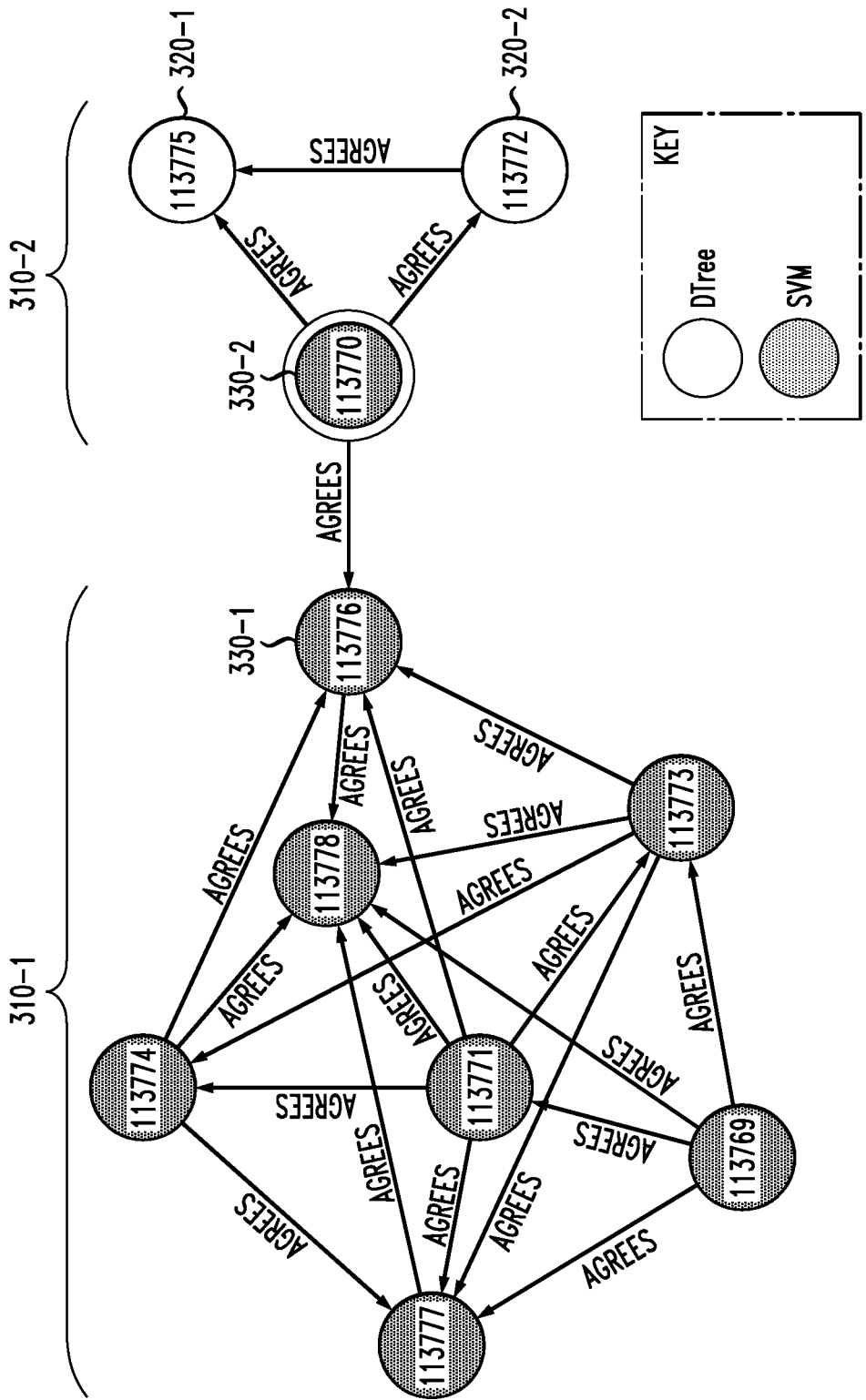
FIG. 3 illustrates an exemplary model agreement network, according to one embodiment.

It can be seen in FIG. 3 that most SVMs form the larger of two communities 310-1 and 310-2 of models. A smaller community concentrates the two instances of Decision Trees 320-1 and 320-2. Two SVMs 330-1 and 330-2 connect both points-of-view.

The two SVMs 330-1 and 330-2 make the transition between a certain set of patterns captured by the largest community of SVMs (a somehow dominant point-of-view towards the phenomenon) and another set of patterns captured by the Decision Trees community 310-1 (a less evident but still valid point-of-view towards the phenomenon).

In the remainder of this disclosure, the structure of the model agreement network 300 is expanded.

Real-Time Anomaly Detection

As noted above, in one or more embodiments, the exemplary real-time anomaly detection process 150 of FIG. 1B compares the real-time response of multiple machine learning models. These machine learning models are represented as nodes in an extended version of the model agreement network 300 (referred to herein as the contextual model agreement network 800, as discussed further below in conjunction with FIG. 8), and the transition edges between nodes encode a number of features present in input data and the level of historical agreement between these models when presented with data with the aforementioned features. Generally, the exemplary contextual model agreement network 800 configures the relative agreements between models in a domain.

Figure 8:
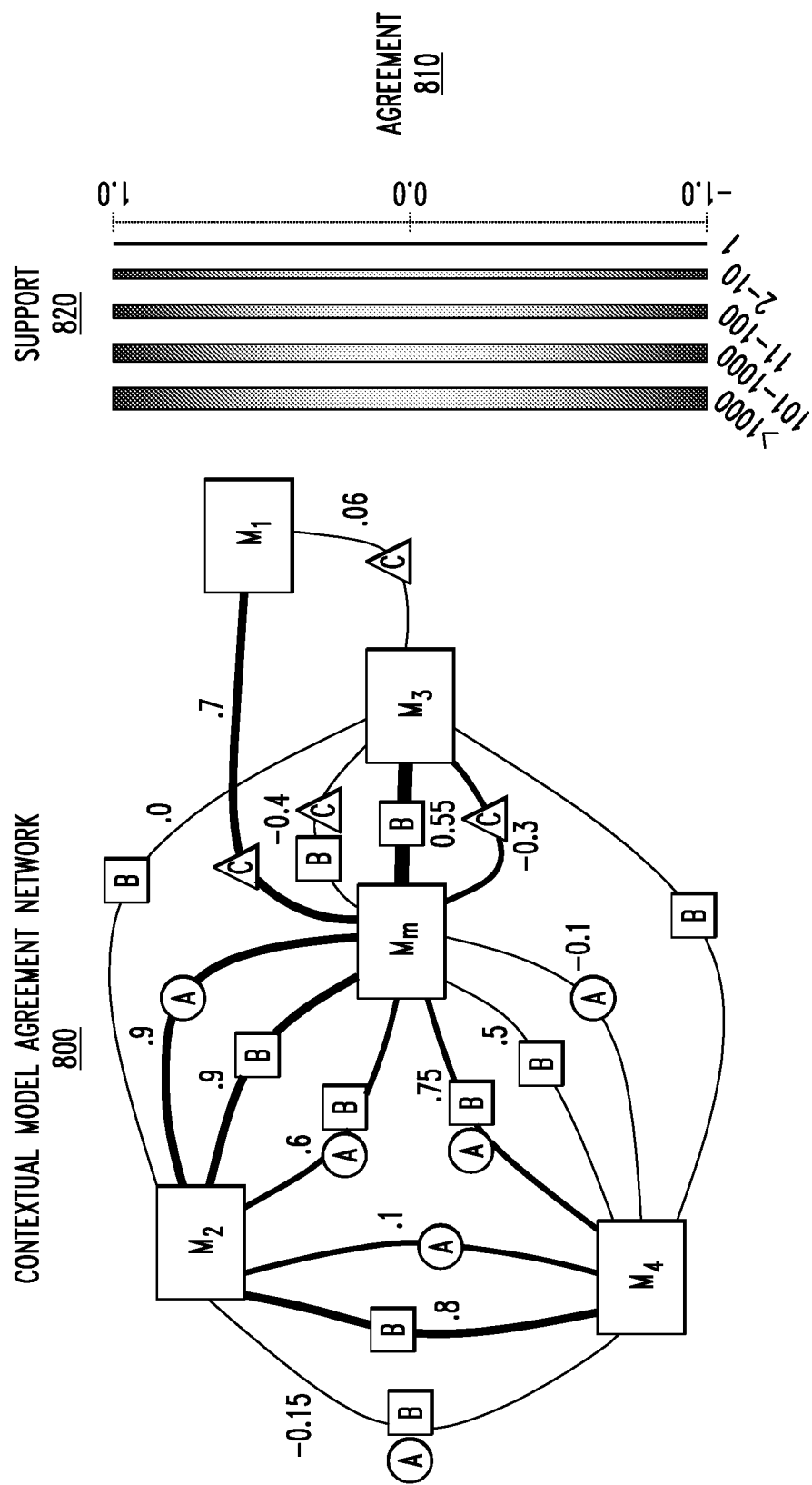
FIG. 8 illustrates an exemplary contextual model agreement network, according to one or more embodiments, with edge weights representing the contextual agreement between machine learning models and visual indications of a corresponding level of confidence.

The computation of anomalies occurs when the agreements encoded in the contextual model agreement network 800 of FIG. 8 are sufficiently different from the normal behavior, encoded within the contextual model agreement network 800 as the level of historical agreement between pairwise models. Nevertheless, the graph weights are also updated when a new observation is derived, as discussed further below.

In describing one or more aspects of the disclosure, it is assumed that appropriate feature extraction procedures for the domain are defined and available. This relates to the representation of features and extraction described above.

Figure 4:
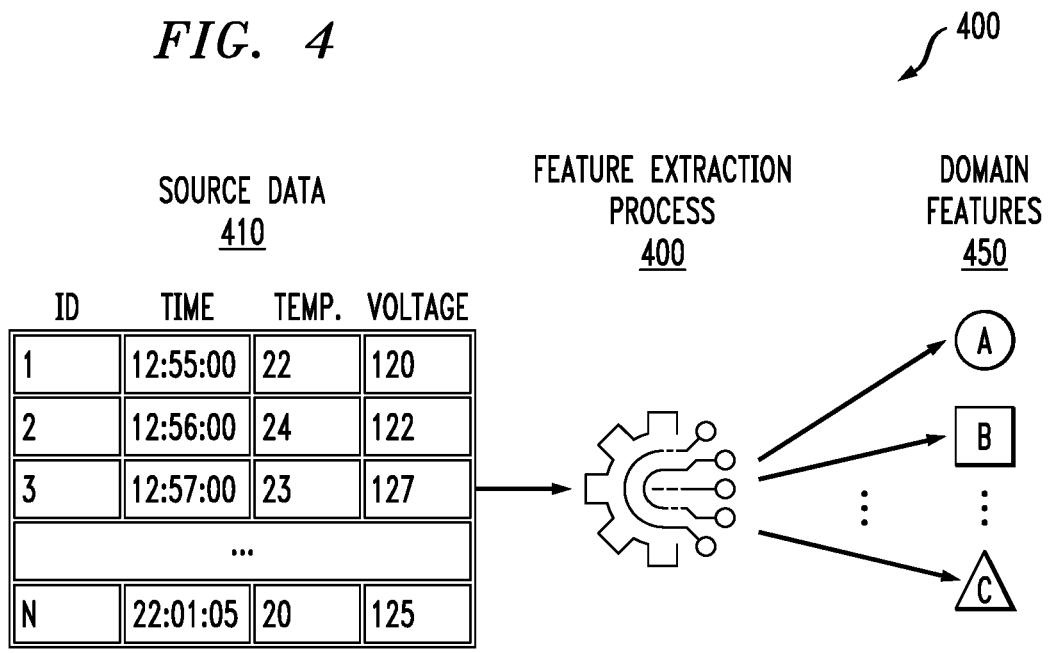
FIG. 4 illustrates a graphical representation of an exemplary feature extraction process, according to at least one embodiment of the disclosure.

FIG. 4 illustrates a graphical representation of an exemplary feature extraction process 400. The exemplary feature extraction process 400 processes source data 410 as a training set to identify relevant domain features 450.

Figure 5:
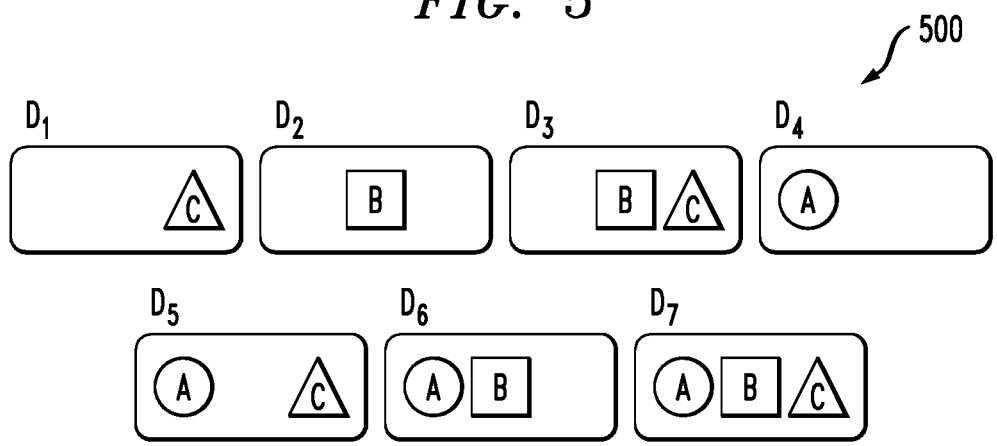
FIG. 5 illustrates an example of possible contexts comprising non-empty subsets of the set of domain features of FIG. 4, according to one embodiment.

As used herein, the term context refers to non-empty subsets of the possible features 450 in the domain. In general, in a domain with n features there are $2^n-1$ possible contexts. FIG. 5 illustrates a simplified example 500 of possible contexts comprising non-empty subsets of the set of domain features 450 of FIG. 4. In the example of FIG. 5, only the three shown domain features A, B and C exist, and there are seven possible contexts (subsets of the set of domain features) $D_1$ through $D_7$.

In addition, in describing one or more aspects of the disclosure, it is also assumed that a set of predictive models is available, each considering potentially different subsets of the features in the domain. This means that each of the machine learning models is composed with a subset of the source data in which a context of the domain features are present.

Figure 6:
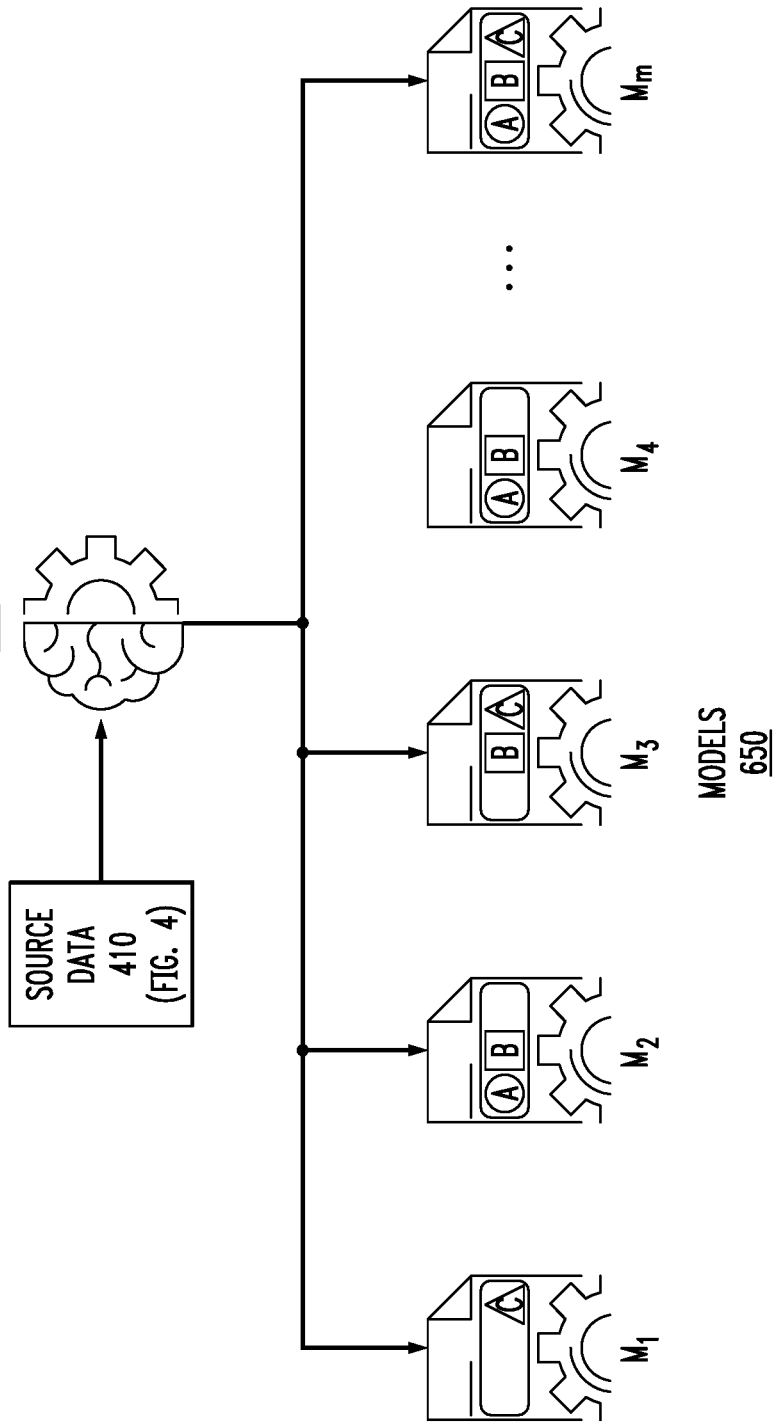
FIG. 6 illustrates a set of predictive models in a domain, according to an embodiment of the disclosure.

FIG. 6 illustrates a set 650 of predictive models $M_1$ through $M_m$ in a domain, according to an embodiment of the disclosure. Each of the predictive models $M_1$ through $M_m$ are trained using a model training process 610 with subsets of the training source data 410 under a certain context (e.g., each model is trained under each context). It is noted that multiple models representing the same context may be present, as is the case of models $M_2$ and $M_4$.

Figure 7:
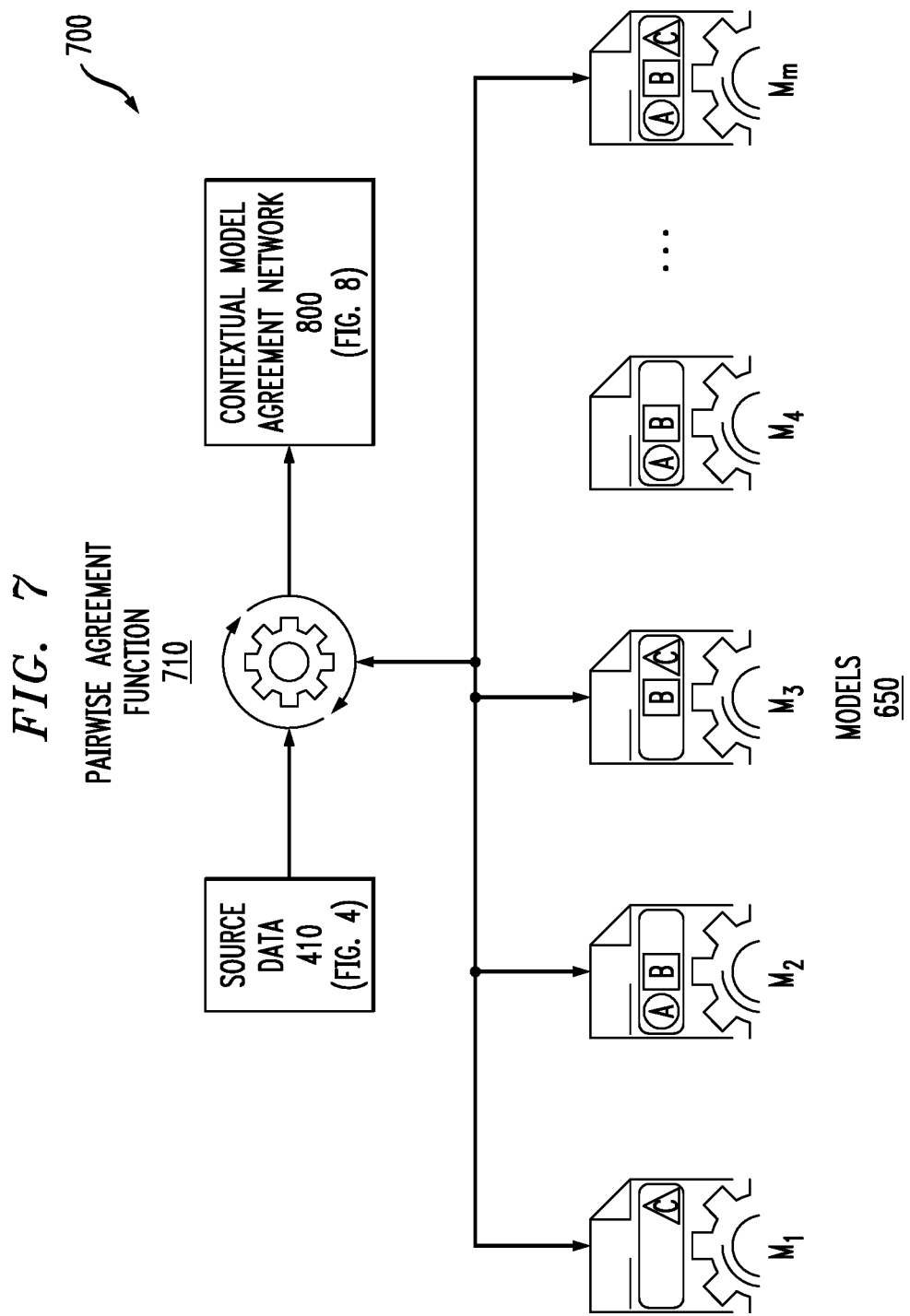
FIG. 7 illustrates an assembly of a contextual pairwise agreement between two machine learning models using a pairwise agreement function, according to some embodiments.

It is noted that in FIGS. 4, 6 and 7 the source data 410 comprises the training data of all models in the set 650, as well as any available datasets collected in the application domain.

Precomputation of Model Ensemble Agreement Based on Data Features

As noted above, one or more embodiments of the disclosure compose a contextual model agreement network 800 (FIG. 8) that contains the levels of agreement between models, as an extension of the model agreement network of FIG. 3. To this end, the pairwise agreement calculation function 200 of FIG. 2 is extended to take into account an additional argument, corresponding to the context of the agreement:

Pairwise Agreement(test_set, model1, model2, ground_truths, context)

Recall that the context corresponds to a non-empty subset of features of the domain. The resulting computation thus yields a model agreement network with the agreements between each pair of models in each context.

FIG. 7 illustrates an assembly 700 of a contextual pairwise agreement yielding a contextual model agreement network 800, as discussed further below in conjunction with FIG. 8. As shown in FIG. 7, the extended pairwise agreement function 710, discussed above, is applied to the training source data 410. In one or more embodiments, a contextual pairwise agreement is computed by the extended pairwise agreement function 710 that is invoked between each pair of models for each possible subset of the domain features that they share in their representation in order to assemble the contextual model agreement network 800 of FIG. 8.

FIG. 8 illustrates an exemplary contextual model agreement network 800, according to some embodiments, with edge weights representing the contextual agreement between machine learning models. In the example of FIG. 8, models $M_2$ and $M_4$, which are generated under the same context, as discussed above in conjunction with FIG. 5, share three edges; one for each non-empty subset of their shared context. Under the same rule, models $M_1$ and $M_3$ are connected by only one edge, since $M_1$'s context only includes one domain feature. In general, the exemplary contextual model agreement network 800 contains $2^k-1$ edges between any two nodes (each representing a model), where k is the cardinality of the intersection of the models' contexts.

The exemplary contextual model agreement network 800 of FIG. 8 also represents the agreement of the models as edge weights. In the network 800, the level of agreement between two models when certain features are present in the input data is given by a weight of the edge representing the context comprised by those features. For ease of illustration, the agreement scores is normalized between −1 and 1 in the disclosed examples.

In some embodiments, the contextual model agreement network 800 may employ a color or grey scale of an edge as a visual cue of the agreement score 810 associated to it, and the line width of the edges indicate the support 820 (e.g., the number of cases in the available data where that particular context was observed). Generally, it is desirable to have a higher support and pairwise agreement (although a pairwise agreement may indicate two models both providing the wrong outcome).

The model agreement network 300 of FIG. 3 provides the basis for the precomputation. In practice, the network 800 is enriched so as to determine, for each possible set of features observed in the training data, the historical agreement of pairs of models in the ensemble when those features are present in the observed data.

Anomalous State Identification and Context Confidence Assessment

An important feature of the disclosed techniques for real-time anomaly detection is to detect possible anomalous states in model building. This can be done through a checking algorithm that looks for inconsistencies in the contextual agreements of models. In this section, this aspect of the disclosure is explored with an example.

Assume models $M_m$ and $M_2$ from the example of FIG. 8. These models have a historically high agreement when the feature represented by the square icon is present (the 'B feature' from here on). However, when the C feature is present, those models tend to disagree. The disclosed techniques for real-time anomaly detection then look at the general relations between models that consider these features in order to determine whether contexts in which both are present are anomalous states. In the present example, the observation that no other pairs of models consider this context, along with the fact that the support of this case is low for models $M_m$ and $M_3$, seems to indicate that it is indeed a context which comprises anomalous states of the system.

Consider, in contrast, the case of models $M_2$ and $M_4$. Here, the agreement between these two models when only the B feature is present is high, 0.8, and low when only the A feature is present, 0.1. Furthermore, the context with both the B and A features shared by these models has very low support (one case). Just like before, this might indicate an anomalous state of the system. However, by observing the relations between $M_2$ and $M_m$ and $M_4$ and $M_2$, that hypothesis is discarded as the context with both B and A features appears with high support and coherent agreement scores in those edges.

The disclosed real-time anomaly detection techniques can therefore classify new data observations as anomalous based on the extracted features, as they indicate contradictory modes of operation of the underlying system. To this end, auxiliary information can be used, such as the support of the relations between models in the example of FIG. 8, taking into consideration the support—the frequency of data containing these two features in the training datasets of those models.

Notice that the intrinsic inconsistencies in the contextual model agreement network 800 are useful not only for identifying contexts that are intrinsically or always anomalous. Rather, these mechanisms may also be used to ponder about the confidence that states in each context are not anomalous. In this sense, a myriad of model checking algorithms could be applied to the structure of the contextual model agreement network 800 to assess a confidence score to each context.

Figure 9:
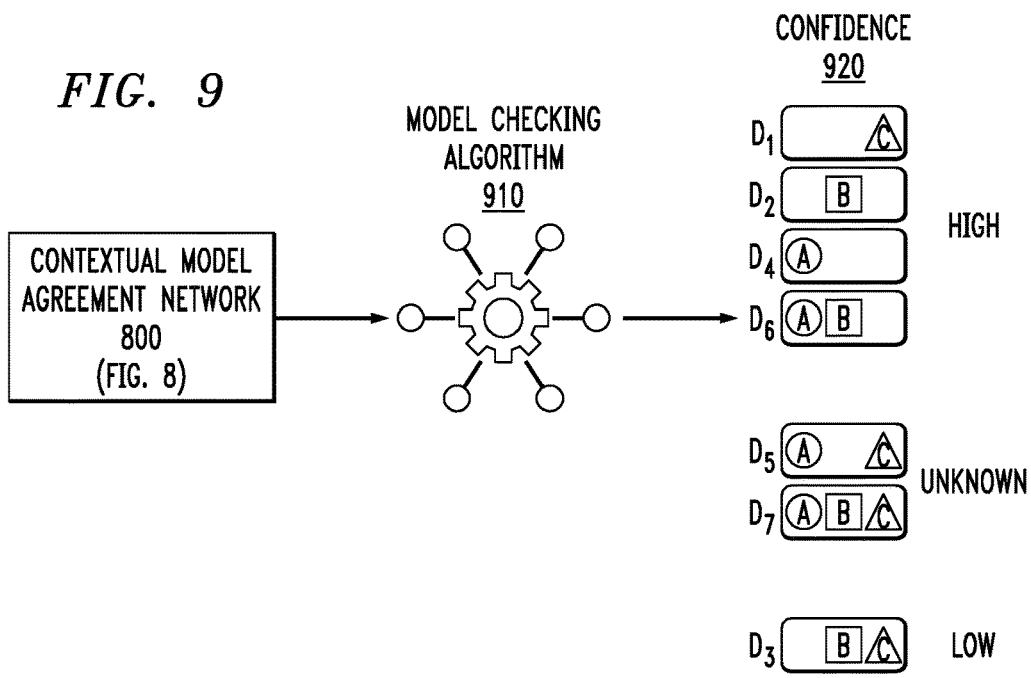
FIG. 9 illustrates a model checking algorithm applied over the contextual model agreement network of FIG. 8, according to one embodiment, to generate a confidence of a number of exemplary domain contexts.

FIG. 9 illustrates a model checking algorithm 910 applied over the contextual model agreement network 800 of FIG. 8, according to one embodiment, to generate a confidence 920 (e.g., a support) of the exemplary domain contexts $D_1$ through $D_7$. These mechanisms could assign a numerical value of confidence to each context. In the example of FIG. 9, the contexts are classified to a High, Low or Unknown confidence, for easy of illustration.

Recall from the above discussion as to why the context $D_3$, in which features B and C are both present, indicates anomalous states of the system. Thus, the model checking algorithm 910 in FIG. 9 classifies context $D_3$ as a low confidence context. Conversely, consider the case of contexts $D_5$ and $D_7$; only model $M_m$ considers both of these contexts. Thus, no relations between models in these contexts are available in the contextual model agreement network 800 and their confidence level can be assigned as unknown.

As would be apparent to a person skilled in the art, whatever implementation of such a checking mechanism, the resulting confidence information 920 can be leveraged by the online pairwise model agreement anomaly detection techniques described herein. The framework may also update these confidence scores in real-time, as explained below.

Pairwise Model Agreement Anomaly-Behavior Detection

This section discusses how anomaly-behavior detection can be performed based on a comparison between historic agreement, annotated in the contextual model agreement network 800, and actual predictions of models in the ensemble.

As noted above, the exemplary real-time anomaly detection process 150 of FIG. 1B extracts the features of the latest data observations in the real world process in real-time, during step 160. Thus, when new data is streamed, the first step is to detect which features are present in the current observed tuple. The same feature extraction mechanisms used to generate the contextual model agreement network 800 can be used.

Figure 10:
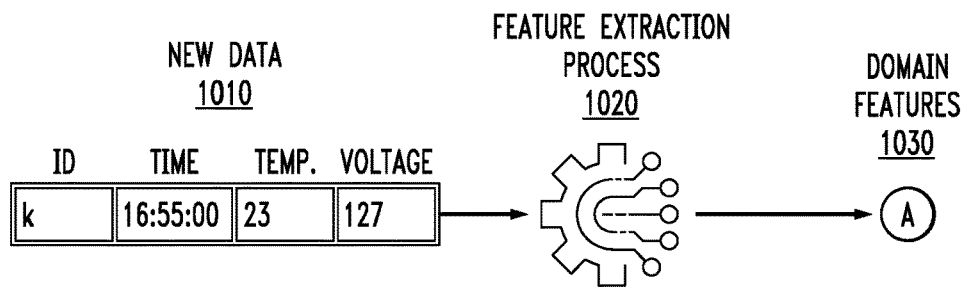
FIG. 10 illustrates an online extraction of features from new data observations from a process and/or monitored system, according to an embodiment.

FIG. 10 illustrates an online extraction of features from new data 1010 comprising, e.g., new observations from a process and/or monitored system, by a feature extraction process 1020 to extract a set of domain features 1030.

As noted above, the exemplary real-time anomaly detection process 150 of FIG. 1B selects the appropriate machine learning models in the ensemble for the current values of the features extracted from the latest data observations during step 165.

Figure 11:
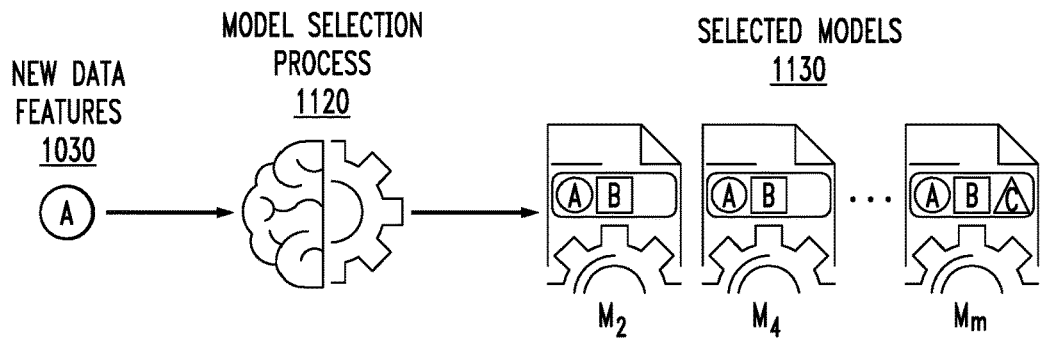
FIG. 11 illustrates a model selection process, according to an embodiment.

FIG. 11 illustrates a model selection process 1120, according to an embodiment. As shown in FIG. 11, a model selection process 1120 identifies a set of selected models 1130 in the ensemble for the current values of the new data features 1030 extracted from the latest observations in accordance with FIG. 10, based on the current values of the extracted features. As noted above, the exemplary real-time anomaly detection process 150 of FIG. 1B compares the pairwise agreement between selected machine learning models in the ensemble model to the agreement between the current predictions of such models during step 175.

Figure 12:
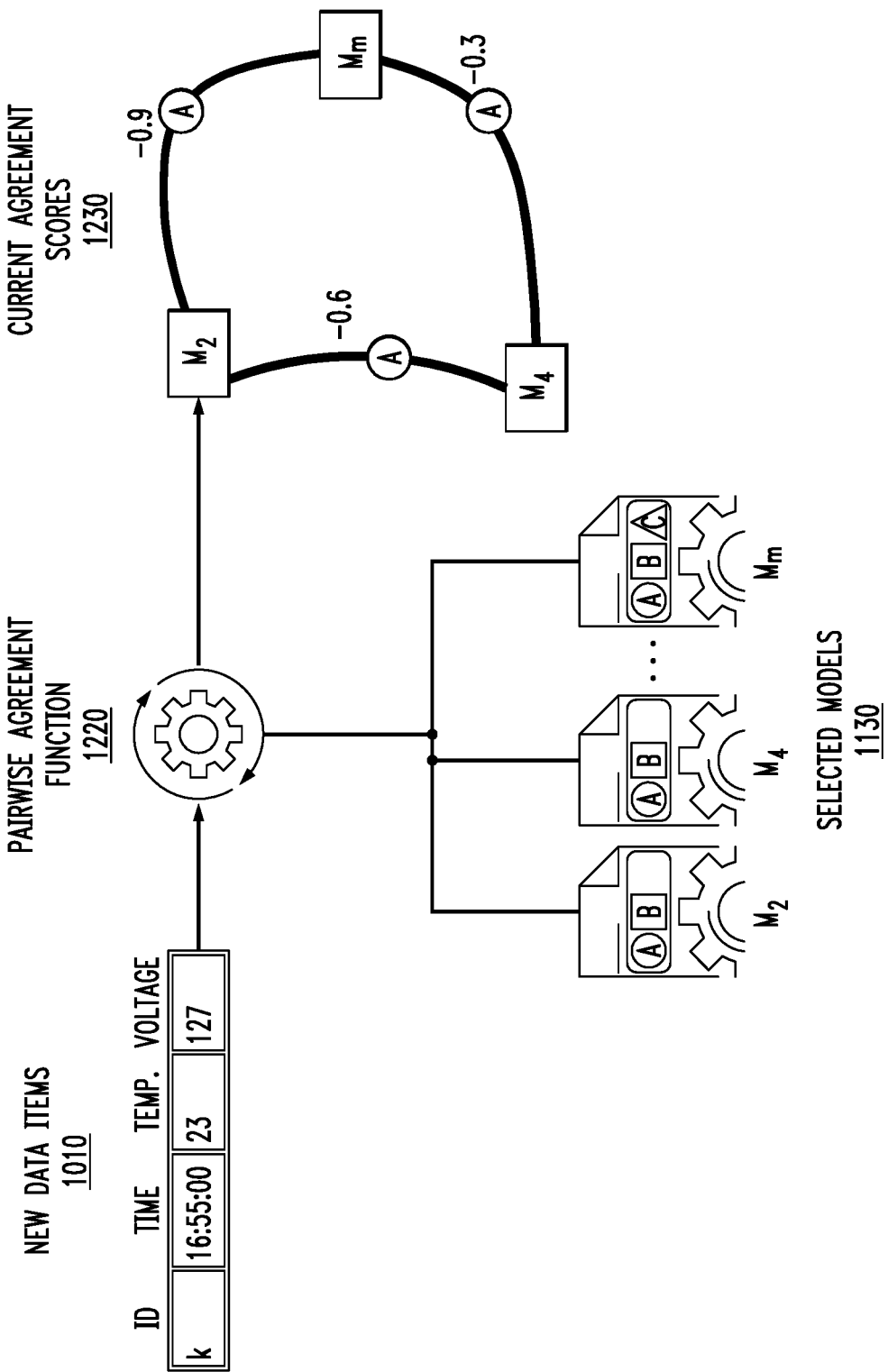
FIG. 12 illustrates an exemplary computation of current agreement scores for the models selected by the model selection process of FIG. 11, according to some embodiments.

FIG. 12 provides an exemplary computation of current agreement scores for the models selected by the model selection process 1120 of FIG. 11, according to some embodiments. As shown in FIG. 12, the new data items 1010 are then passed through the selected models 1130 (e.g., a subset of (potentially all) the relevant machine learning models), which will operate over the new data items 1010 as in a usual ensemble model. The current agreement scores 1230 between those models relating to the new data items 1010 are computed by the pairwise agreement function 1220, calculated in a similar manner as FIG. 7 (e.g., similar mechanisms for agreement computation used to generate the contextual model agreement network 800 can be used).

As noted above, the exemplary real-time anomaly detection process 150 of FIG. 1B decides, upon verifying whether models that historically agree/disagree now disagree/agree, if the current observation configures an anomaly in the time series data, during step 180.

Figure 13:
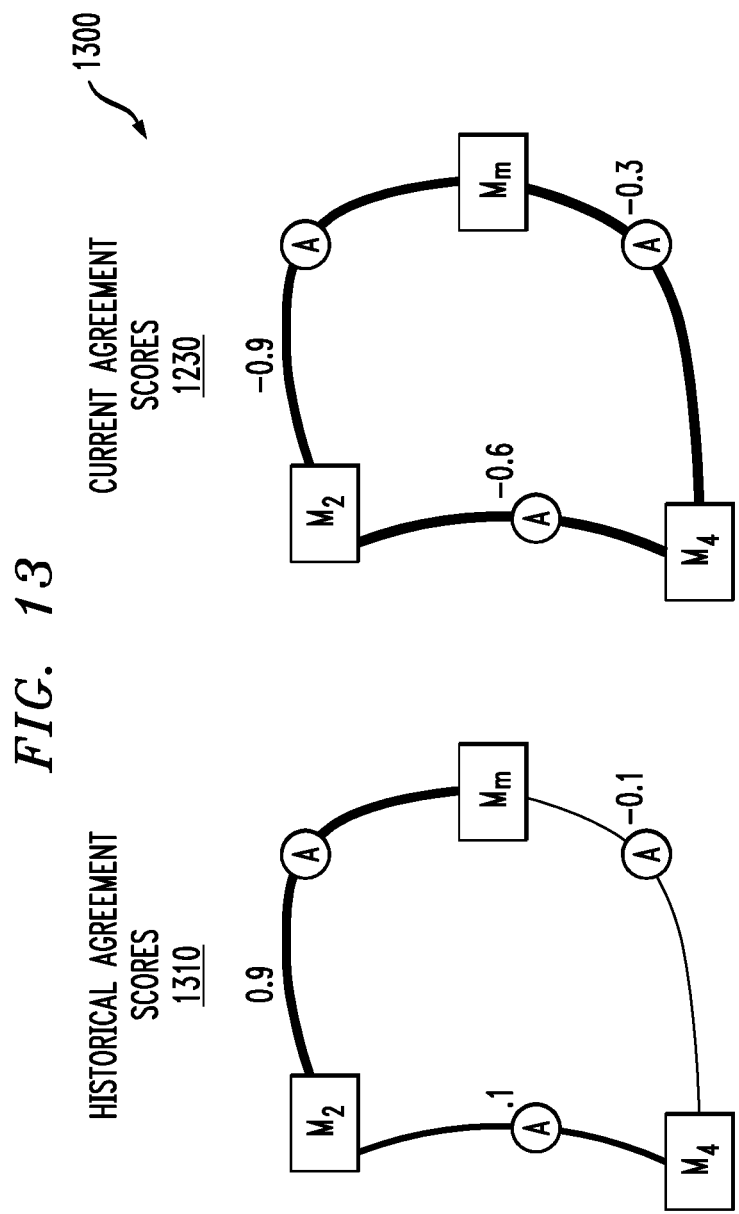
FIG. 13 illustrates a comparison of the historical agreement scores from the contextual model agreement network of FIG. 8 and the current agreement scores computed by the pairwise agreement function of FIG. 12, according to an embodiment of the disclosure.

FIG. 13 illustrates a comparison 1300 of the historical agreement scores 1310 from the contextual model agreement network 800 and the current agreement scores 1230 computed by the pairwise agreement function 1220 of FIG. 12, according to an embodiment of the disclosure. The exemplary comparison 1300 evaluates pairwise agreements (e.g., if the models agree (or disagree) on which class the data belongs to). This information is then compared with the historical levels of agreement in the historical agreement scores 1310. If the historical agreement scores 1310 are not reflected by the current agreement scores 1230, that is an indication of potential anomalous behavior.

In the example of FIG. 13, past agreements in the historical agreement scores 1310 between the models $M_2$, $M_4$ and $M_m$ in the presence of feature A are either very strong (between $M_2$ and $M_m$) or neutral (between $M_2$ and $M_4$, and between $M_4$ and $M_m$). The current agreement scores 1230, however, are all negative, and strongly negative between models $M_2$ and $M_m$. This change in behavior is an indication that the behavior of the system in the new observations comprising the new data 1010 is different than the behavior captured by the data 410 used to train the models. Thus, this new data 1010 is classified as potentially anomalous.

Furthermore, the computation of confidence metrics in the context of the features described above can be used to ratify this reasoning. In the example, the context comprised only by feature A has a 'High' confidence, thus corroborating the indication that the new data 1010 is anomalous. If the context comprised only by feature A has a low' confidence, however, this could be an indication that the models themselves should be updated to consider the new data as part of a new training set.

In general, in relations with lower support, the disclosed real-time anomaly detection techniques are more inclined to classify these data bits as anomalous. In real-time, streaming data is assessed to verify if it contains features $f_i$ and $f_j$, such that $f_i$ and $f_j$ together configure an anomaly. It is important to point out that the pairwise comparison of multiple models ensures more resilient anomaly detection than the comparison of fewer models, in which the change of perception in agreements might be due to a rare occasion.

Continuous Update of Model Ensemble Agreement Relations

During step 185 of the exemplary real-time anomaly detection process 150 of FIG. 1B, edges and edge weights optionally get updated based on the new data observation. The disclosed techniques for real-time anomaly detection work with any update policy that enhances the most recent observations and forgets the ones that happened a long time ago. This feature allows the model to be robust enough in anomaly detection even if there is a change in working modes.

Ideally, such update function should emphasize more strongly recent behavior and forget observations in the long past. In at least one embodiment of this disclosure, this update function can be an exponential smoothing function over agreement levels, defined by Equation (1), as follows:

$$A(k) = \alpha \cdot nA(k) + (1-\alpha) \cdot A(k-1), \qquad (1)$$

where $A(i)$ is the agreement level after i evaluations, $nA(i)$ are the agreements at the i-th evaluation and $\alpha$ is a configurable parameter that regulates how much a new observation should impact the overall agreement graph weights.

Another possibility is to use anomaly score weighted exponential smoothing, which has slower convergence but prevents the disruption of the contextual model agreement network 800 by an anomaly. This schema is detailed in Equation (2), in which $\beta$ is an adaptive smoothing factor, as (i) is the current anomaly score and $as_{MAX}$ is the maximum level of anomaly perceived until the current observation, as follows:

$$A(k) = \beta \cdot nA(k) + (1-\beta) \cdot A(k-1); \qquad (2)$$

$$\beta = \left(1 - \frac{as(i)}{as_{MAX}}\right) \cdot \alpha$$

The anomaly score weighted exponential smoothing algorithm works similarly to simple exponential smoothing and has the same relevant properties, but allows for an adaptive gain alpha, which is inversely proportional to the detected level of anomaly of the current data piece. This latter algorithm ensures that anomalous behavior does not disrupt the graph as much. It has slower convergence to detect new working modes, but it ensures the graph stays consistent to the presence of anomalous behavior that could otherwise affect the graph structure.

Continuous Update of Model Ensemble Confidence Level

In response to new data observations from a process, the confidence levels of the agreement scores between the machine learning models in the ensemble are optionally updated during step 190 of the real-time anomaly detection process 150. For example, the confidence levels can be updated by increasing or decreasing the support according to the number of new observations.

Example

In a datacenter, multiple devices emit the same kind of telemetry to the end-user, including multiple time series of physical aspects such as Voltage and Temperature, and usage aspects such as central processing unit (CPU) % utilization, allocated memory, and cache hit rate, among others.

These time series are composed by multiple observations, which themselves have a number of associated features. For the sake of clarification, imagine a temperature sensor inside a server. The measurements the temperature sensor makes can be associated with numerous features, such as high temperature, low temperature, rising temperature and falling temperature.

For each of the aforementioned features, a number of already deployed machine learning algorithms, which may or may not use temperature as input data, have a level of agreement between them. Suppose that when temperature is falling, machine learning model 1, which predicts resource usage based on CPU % Utilization, predicts a high temperature.

Machine learning model 2, on the other hand, uses temperature to predict resource usage, and it predicts a low temperature. Inspecting the graph for historical agreement when temperature is falling, these models usually have a high level of agreement. Therefore, the anomalous score of this particular data is considered to be high.

It is important to notice that the models used in this example might be models already deployed from previous initiatives from the infrastructure maintenance team. This reinforces the incremental aspect of the proposed methodology by working with legacy software infrastructure.

Automatic anomaly detection is desirable in a number of fields, including but not limited to, finance, manufacturing and data center management.

In some embodiments, the disclosed techniques for real-time anomaly detection leverage the current predictive models within a context and augments the context by computing a contextual model agreement network 800 of agreements. This contextual model agreement network 800, which contains levels of agreements between pairwise models conditioned by the presence of some features in the data, is a resource to discover anomalies, defined by an imbalance between the historical and current agreement levels. An optional mechanism is also disclosed for dynamic update of the aforementioned graph.

One or more embodiments of the disclosure provide improved methods, apparatus and computer program products for real-time anomaly detection. The foregoing applications and associated embodiments should be considered as illustrative only, and numerous other embodiments can be configured using the techniques disclosed herein, in a wide variety of different applications.

It should also be understood that the disclosed real-time anomaly detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for real-time anomaly detection may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based real-time anomaly detection engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based real-time anomaly detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 14 and 15. These platforms may also be used to implement at least portions of other information processing systems in other embodiments.

Figure 14:
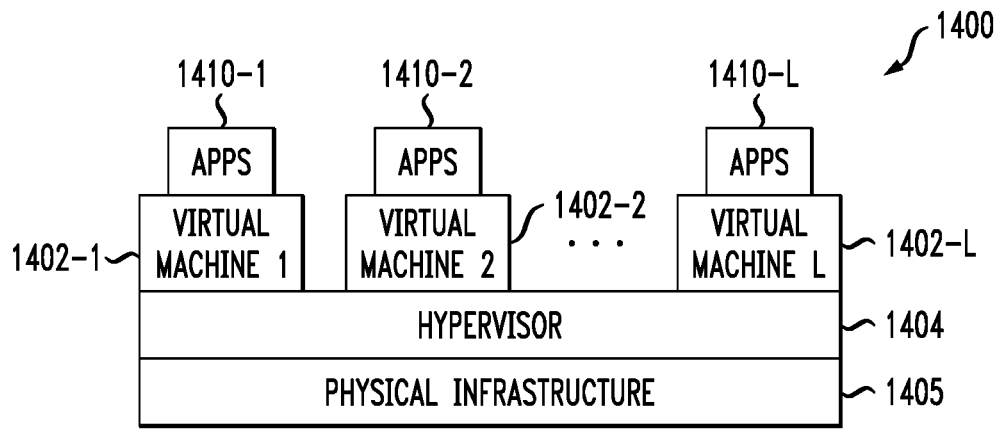
FIG. 14 illustrates an exemplary processing platform that may be used to implement at least a portion of one or more embodiments of the disclosure comprising a cloud infrastructure.

Referring now to FIG. 14, one possible processing platform that may be used to implement at least a portion of one or more embodiments of the disclosure comprises cloud infrastructure 1400. The cloud infrastructure 1400 in this exemplary processing platform comprises virtual machines (VMs) 1402-1, 1402-2, . . . 1402-L implemented using a hypervisor 1404. The hypervisor 1404 runs on physical infrastructure 1405. The cloud infrastructure 1400 further comprises sets of applications 1410-1, 1410-2, . . . 1410-L running on respective ones of the virtual machines 1402-1, 1402-2, . . . 1402-L under the control of the hypervisor 1404.

The cloud infrastructure 1400 may encompass the entire given system or only portions of that given system, such as one or more of client, servers, controllers, or computing devices in the system.

Although only a single hypervisor 1404 is shown in the embodiment of FIG. 14, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 1404 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the real-time anomaly detection engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed real-time anomaly detection apparatus may each run on a computer, server, storage device or other processing platform element. A given such element may be viewed as an example of what is more generally referred to herein as a "processing device." The cloud infrastructure 1400 shown in FIG. 14 may represent at least a portion of one processing platform.

Figure 15:
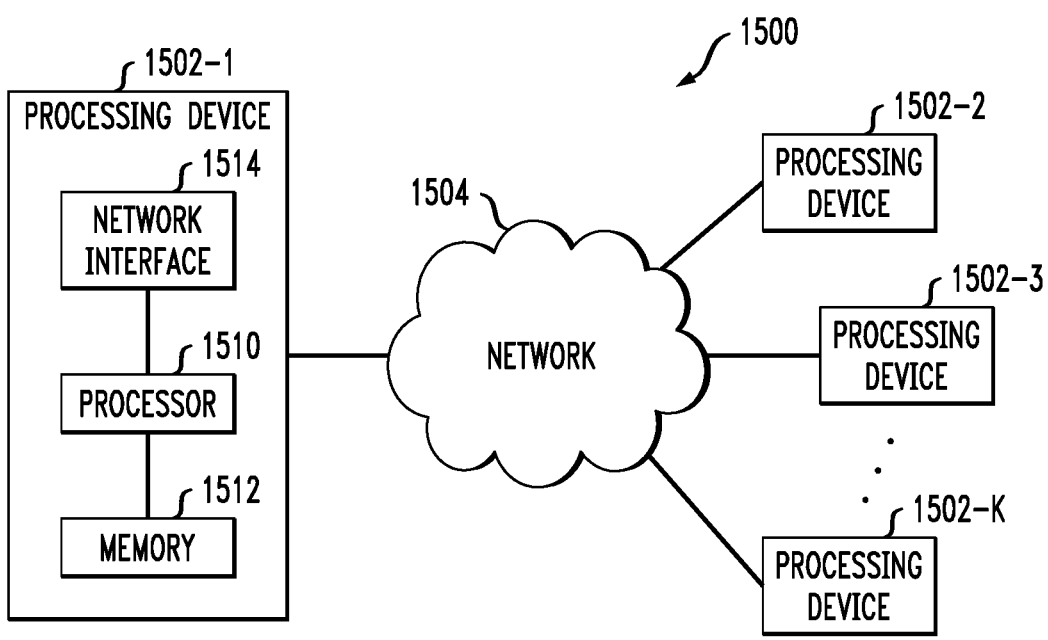
FIG. 15 illustrates another exemplary processing platform that may be used to implement at least a portion of one or more embodiments of the disclosure.

Another example of a processing platform is processing platform 1500 shown in FIG. 15. The processing platform 1500 in this embodiment comprises at least a portion of the given system and includes a plurality of processing devices, denoted 1502-1, 1502-2, 1502-3, . . . 1502-K, which communicate with one another over a network 1504. The network 1504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1502-1 in the processing platform 1500 comprises a processor 1510 coupled to a memory 1512. The processor 1510 may comprise a microprocessor, a microcontroller, an application specific integrated circuit (ASIC), a field programmable gate array (FPGA) or other type of processing circuitry, as well as portions or combinations of such circuitry elements, and the memory 1512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 14 or 15, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    extracting features from historical training data;
    training a plurality of machine learning models using the extracted features;
    annotating the features that were represented in the historical training data used to train each machine learning model;
    obtaining a contextual model agreement network comprising a plurality of nodes and transition edges between the plurality of nodes, wherein each node corresponds to one of the plurality of machine learning models and the transition edges between corresponding pairwise machine learning models encode a level of historical agreement between the corresponding pairwise machine learning models, for a plurality of subsets of features observed in the historical training data, when the subsets of features are present in the historical training data; and
    performing the following steps, using at least one processing device, in response to an availability of one or more data observations:
    extracting features present in the one or more data observations;
    selecting a subset of machine learning models from the plurality of machine learning models based on the extracted features;
    comparing the historical agreement between the selected subset of machine learning models with a current agreement of the selected subset of machine learning models based on predictions by the selected subset of machine learning models; and
    detecting an anomaly in the one or more data observations based on the comparison.

2. The method of claim 1, wherein the transition edges in the contextual model agreement network further encode a level of confidence of the historical agreement between the corresponding pairwise machine learning models, based on a number of samples in the historical training data configuring the subsets of features shared by said machine learning models.

3. The method of claim 2, further comprising updating the level of confidence of the historical agreement between the corresponding pairwise machine learning models in response to a processing of the one or more data observations.

4. The method of claim 1, further comprising generating the contextual model agreement network by using a predefined pairwise agreement function that computes the historical agreement between the corresponding pairwise machine learning models.

5. The method of claim 1, wherein the selecting further comprises obtaining a subgraph of the contextual model agreement network containing transition edges with a substantially same set of features as the extracted features and identifying the machine learning models associated with the nodes in the subgraph.

6. The method of claim 1, wherein the detecting the anomaly in the one or more data observations further comprises evaluating one or more of whether pairwise machine learning models that historically agree or disagree based on the one or more data observations and whether pairwise machine learning models that historically disagree now agree based on the one or more data observations.

7. The method of claim 6, wherein said evaluating additionally considers the level of confidence in the historical agreement between the corresponding pairwise machine learning models.

8. The method of claim 1, further comprising updating the contextual model agreement network to distinguish between anomalies and a new mode of operation.

9. The method of claim 8, wherein each level of historical agreement in the contextual model agreement network is adapted when a new observation is passed through one or more of the machine learning models using one or more of an exponential smoothing technique and an anomaly-weighted exponential smoothing technique.

10. A system, comprising:
    a memory; and
    at least one processing device, coupled to the memory, operative to implement the following steps:
    extracting features from historical training data;
    training a plurality of machine learning models using the extracted features;
    annotating the features that were represented in the historical training data used to train each machine learning model;
    obtaining a contextual model agreement network comprising a plurality of nodes and transition edges between the plurality of nodes, wherein each node corresponds to one of the plurality of machine learning models and the transition edges between corresponding pairwise machine learning models encode a level of historical agreement between the corresponding pairwise machine learning models, for a plurality of subsets of features observed in the historical training data, when the subsets of features are present in the historical training data; and performing the following steps, using at least one processing device, in response to an availability of one or more data observations:

extracting features present in the one or more data observations;

selecting a subset of machine learning models from the plurality of machine learning models based on the extracted features;

comparing the historical agreement between the selected subset of machine learning models with a current agreement of the selected subset of machine learning models based on predictions by the selected subset of machine learning models; and detecting an anomaly in the one or more data observations based on the comparison.

11. The system of claim 10, wherein the transition edges in the contextual model agreement network further encode a level of confidence of the historical agreement between the corresponding pairwise machine learning models, based on a number of samples in the historical training data configuring the subsets of features shared by said machine learning models.

12. The system of claim 10, wherein the selecting further comprises obtaining a subgraph of the contextual model agreement network containing transition edges with a substantially same set of features as the extracted features and identifying the machine learning models associated with the nodes in the subgraph.

13. The system of claim 10, wherein the detecting the anomaly in the one or more data observations further comprises evaluating one or more of whether pairwise machine learning models that historically agree or disagree based on the one or more data observations and whether pairwise machine learning models that historically disagree now agree based on the one or more data observations.

14. The system of claim 10, wherein each level of historical agreement in the contextual model agreement network is adapted when a new observation is passed through one or more of the machine learning models using one or more of an exponential smoothing technique and an anomaly-weighted exponential smoothing technique.

15. The system of claim 10, further comprising generating the contextual model agreement network by using a predefined pairwise agreement function that computes the historical agreement between the corresponding pairwise machine learning models.

16. The system of claim 10, further comprising updating the contextual model agreement network to distinguish between anomalies and a new mode of operation.

17. A computer program product, comprising a non-transitory processor-readable storage medium having encoded therein executable code of one or more software programs, wherein the one or more software programs when executed by at least one processing device perform the following steps:

extracting features from historical training data;

training a plurality of machine learning models using the extracted features;

annotating the features that were represented in the historical training data used to train each machine learning model;

obtaining a contextual model agreement network comprising a plurality of nodes and transition edges between the plurality of nodes, wherein each node corresponds to one of the plurality of machine learning models and the transition edges between corresponding pairwise machine learning models encode a level of historical agreement between the corresponding pairwise machine learning models, for a plurality of subsets of features observed in the historical training data, when the subsets of features are present in the historical training data; and performing the following steps, using at least one processing device, in response to an availability of one or more data observations:

extracting features present in the one or more data observations;

selecting a subset of machine learning models from the plurality of machine learning models based on the extracted features;

comparing the historical agreement between the selected subset of machine learning models with a current agreement of the selected subset of machine learning models based on predictions by the selected subset of machine learning models; and detecting an anomaly in the one or more data observations based on the comparison.

18. The computer program product of claim 17, wherein the transition edges in the contextual model agreement network further encode a level of confidence of the historical agreement between the corresponding pairwise machine learning models, based on a number of samples in the historical training data configuring the subsets of features shared by said machine learning models.

19. The computer program product of claim 17, wherein the detecting the anomaly in the one or more data observations further comprises evaluating one or more of whether pairwise machine learning models that historically agree or disagree based on the one or more data observations and whether pairwise machine learning models that historically disagree now agree based on the one or more data observations.

20. The computer program product of claim 17, further comprising generating the contextual model agreement network by using a predefined pairwise agreement function that computes the historical agreement between the corresponding pairwise machine learning models.

* * * * *